United States Patent
Narayana et al.

(10) Patent No.: US 8,995,081 B2
(45) Date of Patent: Mar. 31, 2015

(54) DISK DRIVE MINIMIZING INITIAL SEEK DISTANCE AFTER LOAD OPERATION

(71) Applicant: Western Digital Technologies, Inc., Irvine, CA (US)

(72) Inventors: Aswartha Narayana, Aliso Viejo, CA (US); Orhan Beker, Dove Canyon, CA (US)

(73) Assignee: Western Digitial Technologies, Inc., Irvine, CA (US)

(*) Notice: Subject to any disclaimer, the term of this patent is extended or adjusted under 35 U.S.C. 154(b) by 0 days.

(21) Appl. No.: 13/872,029

(22) Filed: Apr. 26, 2013

(65) Prior Publication Data

US 2014/0320999 A1     Oct. 30, 2014

(51) Int. Cl.
    *G11B 5/596*     (2006.01)
    *G11B 21/02*     (2006.01)
    *G11B 5/55*     (2006.01)

(52) U.S. Cl.
    CPC ................................... *G11B 5/5547* (2013.01)
    USPC ........................ 360/78.06; 360/75; 360/78.14

(58) Field of Classification Search
None
See application file for complete search history.

(56) References Cited

U.S. PATENT DOCUMENTS

| 5,675,558 | A | 10/1997 | Katoh |
| 6,256,163 | B1 | 7/2001 | Schmidt et al. |
| 7,315,432 | B2 | 1/2008 | Lee |
| 7,542,224 | B2 * | 6/2009 | Church et al. ................... 360/75 |
| 2002/0027740 | A1 * | 3/2002 | Inaji et al. ................... 360/78.06 |

* cited by examiner

*Primary Examiner* — Andrew L Sniezek

(57) ABSTRACT

A disk drive is disclosed comprising a disk comprising tracks defined by servo sectors, a head, and control circuitry comprising a servo control system operable to actuate the head over the disk in response to the servo sectors. The head is loaded over the disk during a load operation, and a radial velocity of the head is determined during the load operation. A target track is generated based on the determined radial velocity of the head, and the servo control system seeks the head to the target track.

16 Claims, 4 Drawing Sheets

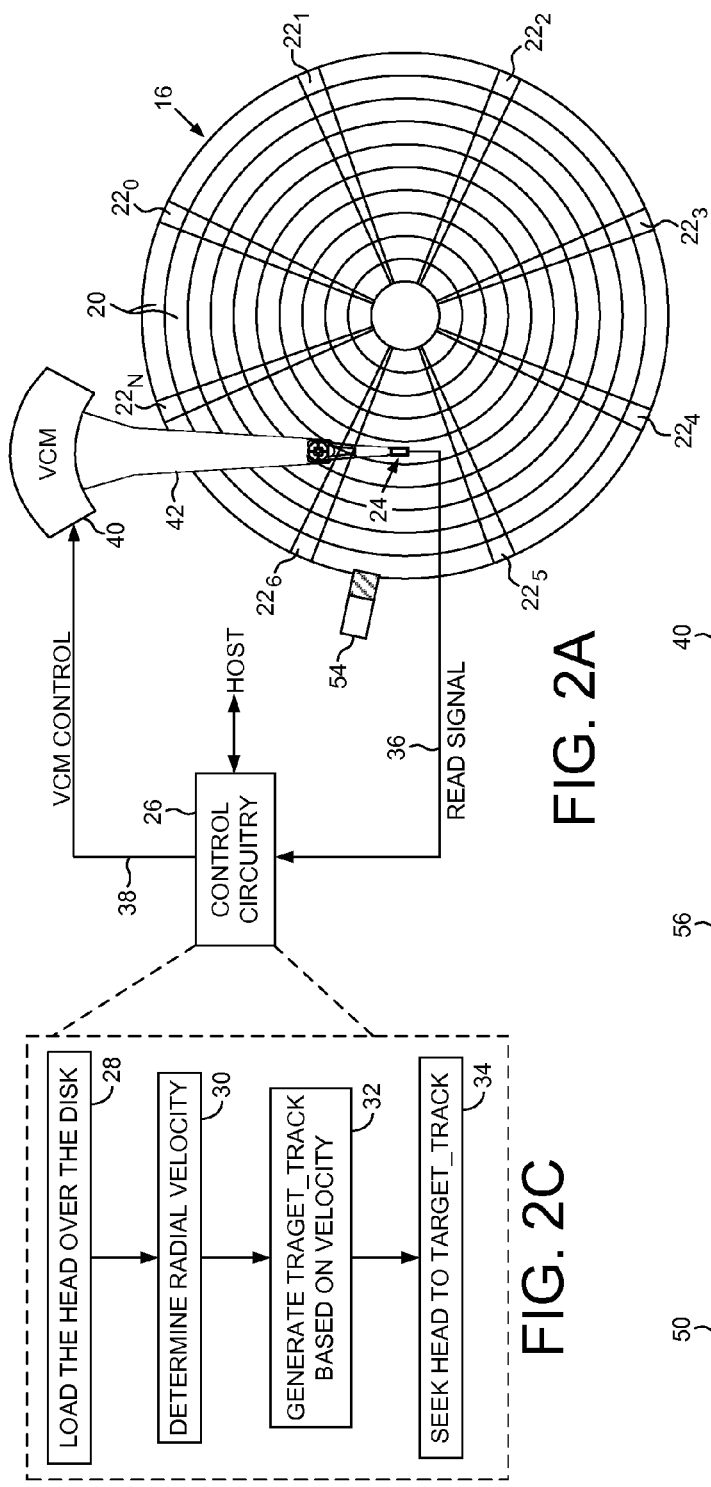
FIG. 2A
FIG. 2C
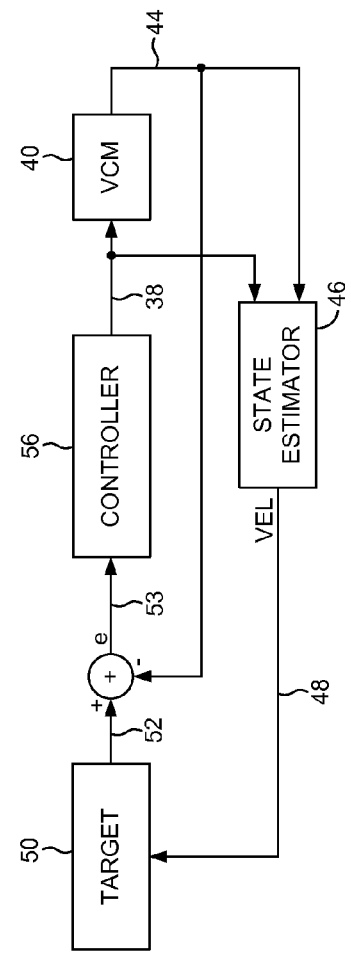
FIG. 2B

DISK DRIVE MINIMIZING INITIAL SEEK DISTANCE AFTER LOAD OPERATION

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations.

BRIEF DESCRIPTION OF THE DRAWINGS

FIG. 2A is a disk drive according to an embodiment comprising a head actuated over a disk by a servo control system.

FIG. 2B shows a servo control system according to an embodiment operable to actuate the head over the disk.

FIG. 2C is a flow diagram according to an embodiment wherein during a load operation the radial velocity of the head is determined and used to generate a target track, and the servo control system seeks the head to the target track.

DETAILED DESCRIPTION

Figure 1:
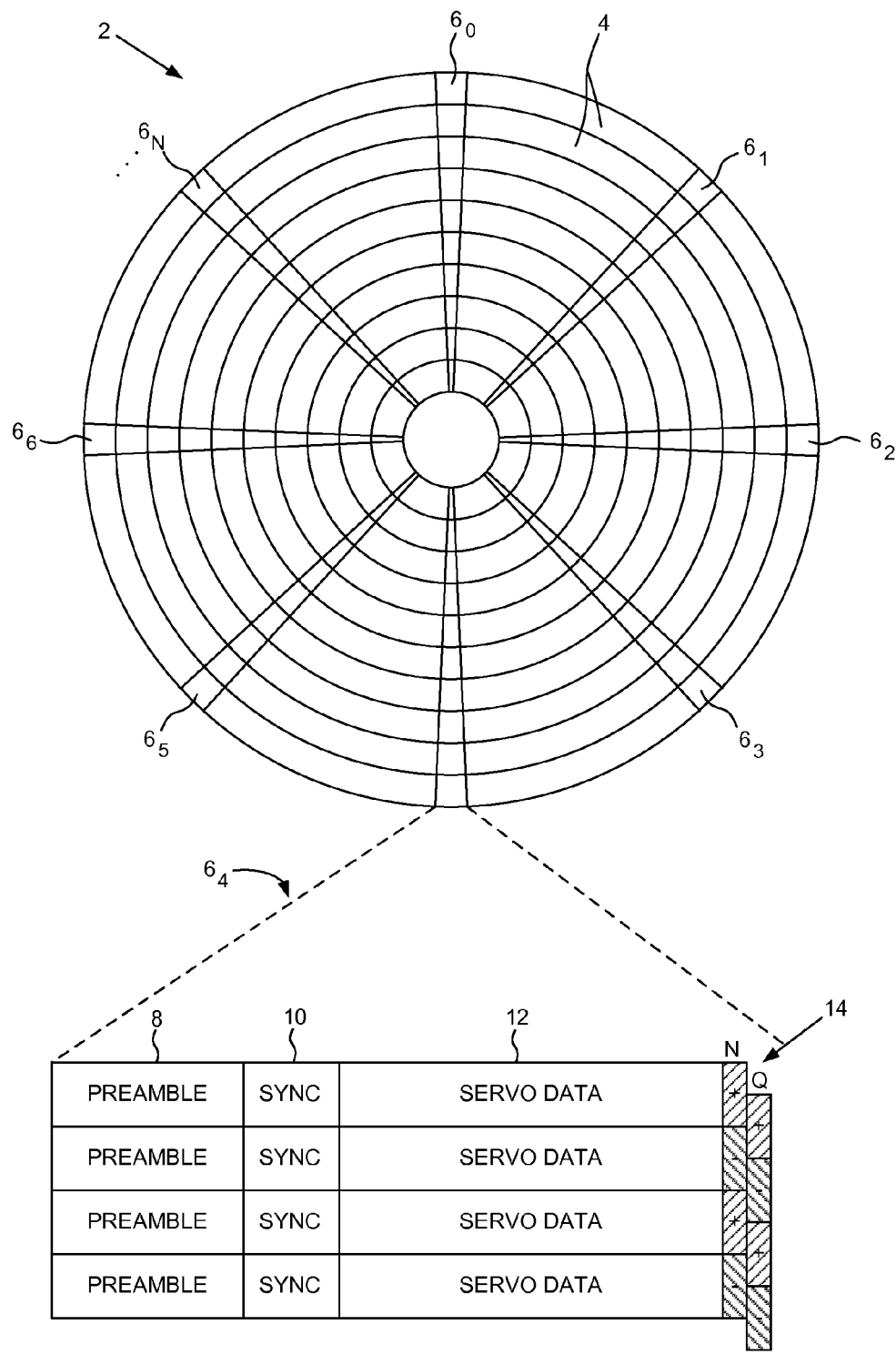
FIG. 1 shows a prior art disk format comprising a plurality of servo tracks defined by embedded servo sectors.

FIG. 2A shows a disk drive according to an embodiment comprising a disk 16 comprising tracks 20 defined by servo sectors $22_0$-$22_N$, a head 24, and control circuitry 26 comprising a servo control system operable to actuate the head 24 over the disk 16 in response to the servo sectors $22_0$-$22_N$. The control circuitry 26 is operable to execute the flow diagram of FIG. 2C wherein the head is loaded over the disk during a load operation (block 28), and a radial velocity of the head is determined during the load operation (block 30). A target track is generated based on the determined radial velocity of the head (block 32), and the servo control system seeks the head to the target track (block 34).

In the embodiment of FIG. 2A, the control circuitry 26 processes a read signal 36 emanating from the head 24 to demodulate the servo sectors $22_0$-$22_N$ and generate a position error signal (PES) representing an error between the actual position of the head and a target position relative to a target track. The control circuitry 26 filters the PES using a suitable compensation filter to generate a control signal 38 applied to a voice coil motor (VCM) 40 which rotates an actuator arm 42 about a pivot in order to actuate the head 24 radially over the disk 16 in a direction that reduces the PES. The servo sectors $22_0$-$22_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

When the disk drive is powered down, or enters an idle mode, the head 24 may be unloaded onto a ramp 54 so that the disk 16 may be spun down. When the disk drive is powered on, or exits an idle mode, the disk 16 is spun up and the head 24 is loaded over the disk 16 during a load operation. In the embodiment of FIG. 2A, the ramp 54 is located near an outer diameter (OD) of the disk 16 such that the head 24 may be loaded toward an inner diameter (ID) of the disk 16. In another embodiment, the head 24 may be parked near the ID of the disk 16 when the disk is spun down such that the head 24 may be loaded toward the OD of the disk 16 when spun up.

In one embodiment, during the load operation an initial radial velocity of the head 24 is determined so that the head 24 may be decelerated over a minimal seek length, thereby helping reduce acoustic noise that may otherwise occur if the servo control system were to initially seek the head over a fixed seek length to a target track. For example, if a fixed seek length were employed independent of the initial radial velocity, the initial seek may include an acceleration and then deceleration toward the target track which may exacerbate acoustic noise. To attenuate this acoustic noise, in one embodiment an initial seek length is generated based on the initial radial velocity of the head so that the initial seek includes mainly a deceleration of the head toward the target track. Seeking the head over a minimal seek length during the load operation may also reduce the "time to ready" of the disk drive.

FIG. 2B shows a servo control system according to an embodiment for generating the control signal 38 applied to the VCM 40, where a position 44 of the head 24 is measured by reading the servo sectors $22_0$-$22_N$. The control signal 38 and the head position 44 are processed by a state estimator 46 to determine a radial velocity 48 of the head 24. The state estimator 46 may determine the radial velocity of the head 24 by computing a derivative of the head position 44, or by using a more sophisticated model based estimation algorithm. The determined radial velocity 48 of the head 24 is evaluated at block 50 to generate a target track for the initial seek. In one embodiment, the target track represents a reference signal 52 from which the head position 44 is subtracted to generate an error signal 53. The error signal 53 is processed by a suitable controller 56 implementing a feedback algorithm to generate the control signal 38 applied to the VCM 40.

Figure 3A:
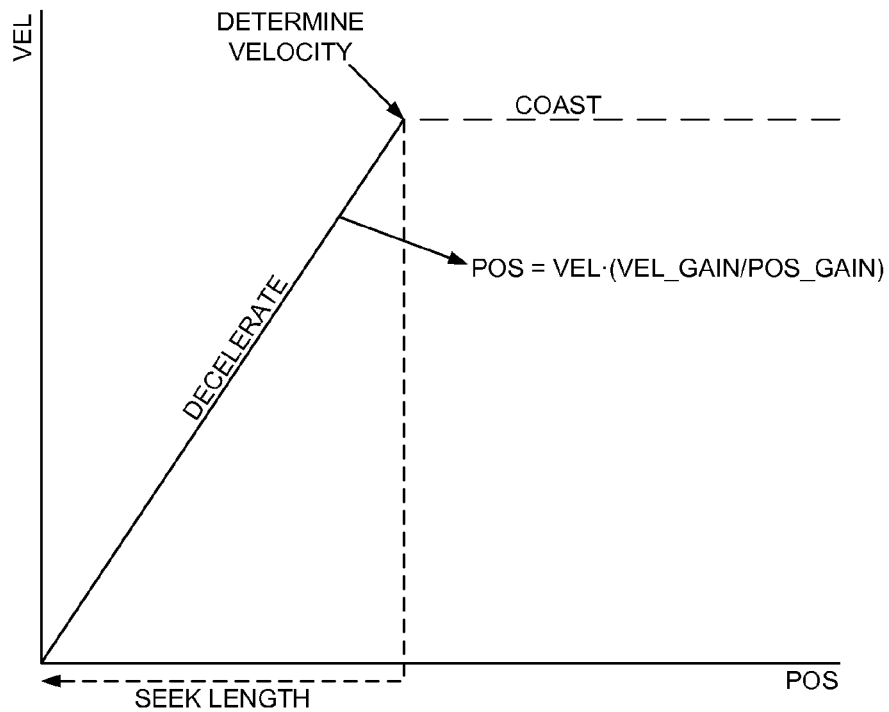
FIG. 3A shows a state trajectory profile for determining the initial seek length and the corresponding target track during the load operation.

In one embodiment, the servo control system is designed to achieve a desired level of performance and stability. After configuring the feedback algorithm of the controller 56, the states of the servo control system can be modeled based on a resulting state trajectory profile. An example state trajectory profile is shown in FIG. 3A wherein the servo control system drives the position of the head 24 toward zero which represents the target track of a seek operation. The seek operation may comprise an acceleration phase (not shown), followed by a constant velocity phase, followed by a deceleration phase. In one embodiment, during a load operation the initial radial velocity of the head 24 is determined and treated as the constant velocity (coast) of the state trajectory profile. A seek length is then determined as shown in FIG. 3A based on the coast velocity to thereby force the servo control system to mainly decelerate the head 24 toward a corresponding target track (e.g., drive the position and velocity states toward zero).

In the example of FIG. 3A, the servo control system comprises a position gain and a velocity gain such that the state trajectory profile may be defined as:

$$POS=VEL \cdot VEL\_GAIN/POS\_GAIN$$

where VEL represents the radial velocity of the head, VEL_GAIN represents the velocity gain of the servo control system, and POS_GAIN represents the position gain of the servo control system. Accordingly, during a load operation the initial radial velocity of the head 24 may be determined, and then a seek length determined based on the above equation that will cause the servo control system to mainly decelerate the head 24 toward a target track (drive the position and velocity states toward zero as shown in FIG. 3A).

Figure 3B:
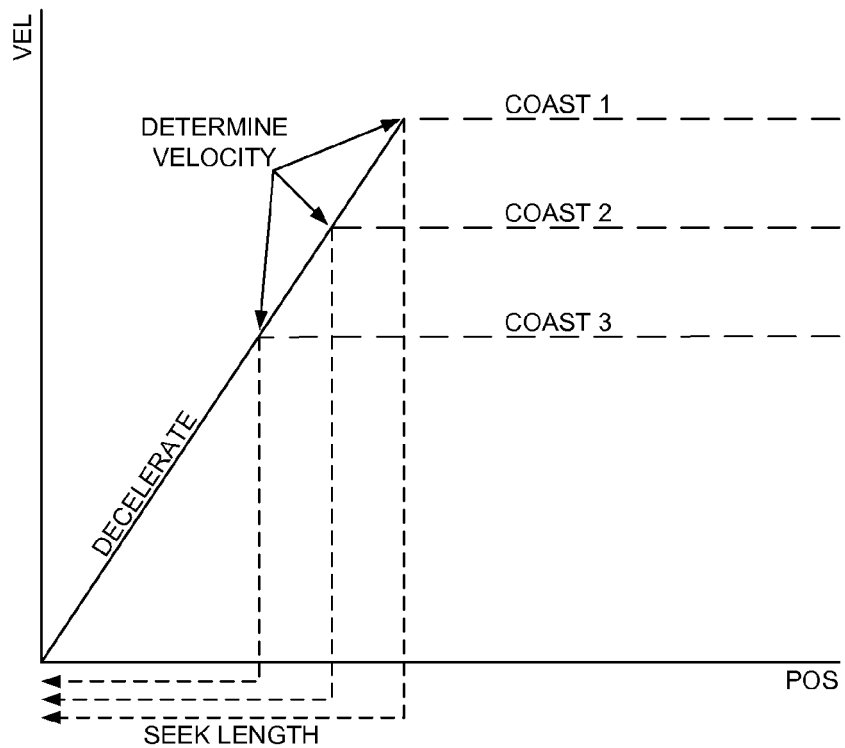
FIG. 3B shows an example embodiment where the radial velocity of the head may be different for different load operations, resulting in a different seek length to the target track.

FIG. 3B illustrates different coast velocities of the head 24 that may occur during different load operations, wherein for each coast velocity there is a corresponding seek length defined by the state trajectory profile that will cause the servo control system to mainly decelerate the head toward a corresponding target track. The coast velocity of the head may vary during a load operation for a number of reasons, such as variations in the temperature of the VCM 40, different physical orientations of the disk drive in portable applications, or degradation of the VCM 40 over time. Determining the radial velocity of the head 24 during the load operation, and generating the target track for the initial seek based on the determined radial velocity enables the servo control system to mainly decelerate the head 24 as soon as the servo control system is enabled. That is, the servo control system performs a minimum length seek based on the state trajectory profile as shown in FIG. 3B which may help reduce acoustic noise as well as reduce the "time to ready" of the disk drive.

Figure 4:
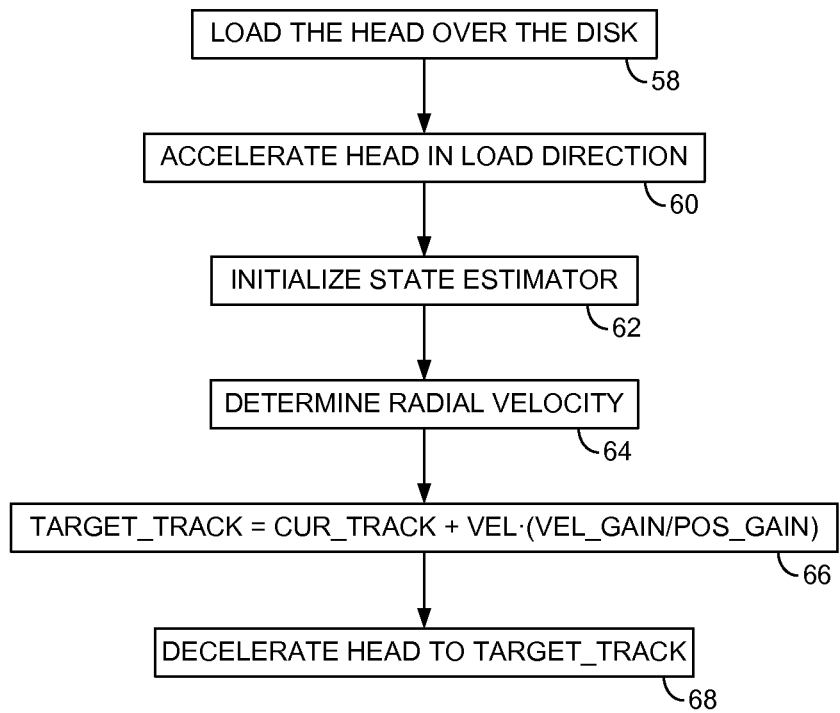
FIG. 4 is a flow diagram according to an embodiment wherein the target track is determined relative to the current track, and the servo control system decelerates the head toward the target track.

FIG. 4 is a flow diagram according to an embodiment wherein during a load operation the head is loaded over the disk (block 58) such that the head is moving, for example, toward an inner diameter of the disk at an unknown velocity. The head is accelerated over a short interval (block 60) in the same direction as the load operation in order to initialize the state estimator 46 of FIG. 2B (block 62). After initialization, the state estimator may be used to determine the radial velocity of the head (block 64). A target track may then be determined based on the determined radial velocity of the head according to:

$$TARGET\_TRACK=CUR\_TRACK+\\VEL \cdot VEL\_GAIN/POS\_GAIN$$

where CUR_TRACK represents a current track the head is over when the radial velocity of the head is determined. That is, the minimum seek length is determined based on the determined radial velocity of the head which is then added to the current track to generate the target track. The servo control system then decelerates the head toward the target track (block 68) as shown in FIG. 3B, wherein the zero position of the x-axis represents the location of the target track.

The state trajectory profile shown in FIG. 3B comprises a first order (linear) relationship between the radial velocity of the head and the position of the head relative to the target track. Other embodiments may employ a different feedback algorithm in the controller 56 that results in a different state trajectory profile, such as a higher order function (e.g., a quadratic). Regardless, the position of the head that corresponds to the minimum seek length from the determined radial velocity of the head can be determined based on the state trajectory profile.

In one embodiment, the closed-loop transfer function of the servo control system, including the transfer function of the feedback algorithm in the controller 56, determines the function representing the state trajectory profile (e.g., velocity versus position). Accordingly in this embodiment, the error signal 53 in the embodiment of FIG. 2B may represent a position error between the current position of the head and the target track. In another embodiment, the state trajectory profile such as shown in FIG. 3B may be predetermined and generated as the reference signal 52 in FIG. 2B, where the error signal 53 may represent a position error between the current position of the head and the target position relative to the state trajectory profile.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
    a disk comprising tracks defined by servo sectors;
    a head; and
    control circuitry comprising a servo control system operable to actuate the head over the disk in response to the servo sectors, the control circuitry operable to:
        load the head over the disk during a load operation;
        compute a radial velocity of the head while the head is moving over the disk during the load operation;
        generate a target track using the computed radial velocity of the head; and
        seek the head to the target track using the servo control system.

2. The disk drive as recited in claim 1, wherein the control circuitry is further operable to generate the target track based on the determined radial velocity of the head and a state trajectory profile.

3. The disk drive as recited in claim 1, wherein the control circuitry is further operable to:
    determine a current track corresponding to when the radial velocity of the head is determined; and
    mainly decelerate the head from the current track to the target track.

4. The disk drive as recited in claim 1, wherein:
    the servo control system comprises a position gain and a velocity gain;
    the control circuitry is operable to generate the target track based on:

$$VEL \cdot VEL\_GAIN/POS\_GAIN$$

where:
    VEL represents the determined radial velocity of the head;
    VEL_GAIN represents the velocity gain of the servo control system; and
    POS_GAIN represents the position gain of the servo control system.

5. The disk drive as recited in claim 4, wherein the control circuitry is operable to generate the target track based on:

$$CUR\_TRACK+VEL \cdot VEL\_GAIN/POS\_GAIN$$

where CUR_TRACK represents a current track the head is over when the radial velocity of the head is determined.

6. The disk drive as recited in claim 5, wherein the control circuitry is further operable to decelerate the head from the current track to the target track.

7. The disk drive as recited in claim 1, wherein the control circuitry is operable to determine the radial velocity of the head in response to the servo sectors.

8. The disk drive as recited in claim 7, wherein the servo control system comprises a state estimator, the control circuitry is further operable to:
    load the head over the disk in a direction toward one of an inner diameter of the disk and an outer diameter of the disk; and
    accelerate the head in the direction of the load in order to initialize the state estimator, wherein after initialization the state estimator is operable to determine the radial velocity of the head.

9. A method of operating a disk drive comprising a disk comprising tracks defined by servo sectors, a head, and control circuitry comprising a servo control system operable to actuate the head over the disk in response to the servo sectors, the method comprising:
    loading the head over the disk during a load operation;
    computing a radial velocity of the head while the head is moving over the disk during the load operation;
    generating a target track using the computed radial velocity of the head; and
    seeking the head to the target track using the servo control system.

10. The method as recited in claim 9, further comprising generating the target track based on the determined radial velocity of the head and a state trajectory profile.

11. The method as recited in claim 9, further comprising:
    determining a current track corresponding to when the radial velocity of the head is determined; and
    mainly decelerating the head from a current track to the target track.

12. The method as recited in claim 9, wherein:
    the servo control system comprises a position gain and a velocity gain;
    the method further comprising generating the target track based on:

$$VEL \cdot VEL\_GAIN/POS\_GAIN$$

where:
    VEL represents the determined radial velocity of the head;
    VEL_GAIN represents the velocity gain of the servo control system; and
    POS_GAIN represents the position gain of the servo control system.

13. The method as recited in claim 12, further comprising generating the target track based on:

$$CUR\_TRACK+VEL \cdot VEL\_GAIN/POS\_GAIN$$

where CUR_TRACK represents a current track the head is over when the radial velocity of the head is determined.

14. The method as recited in claim 13, further comprising decelerating the head from the current track to the target track.

15. The method as recited in claim 9, further comprising determining the radial velocity of the head in response to the servo sectors.

16. The method as recited in claim 15, wherein the servo control system comprises a state estimator, the method further comprising:
    loading the head over the disk in a direction toward one of an inner diameter of the disk and an outer diameter of the disk; and
    accelerating the head in the direction of the load in order to initialize the state estimator, wherein after initialization the state estimator is operable to determine the radial velocity of the head.

* * * * *